United States Patent
Namadevan et al.

(10) Patent No.: US 11,852,272 B2
(45) Date of Patent: Dec. 26, 2023

(54) CHECK VALVE ASSEMBLY

(71) Applicant: General Electric Company, Schenectady, NY (US)

(72) Inventors: Arvind Namadevan, Bengaluru (IN); Urmi Tejaswini, Bengaluru (IN); Dharmaraj Pachaiappan, Bengaluru (IN); Hiranya Nath, Bengaluru (IN); Ravindra Shankar Ganiger, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/362,313

(22) Filed: Jun. 29, 2021

(65) Prior Publication Data
US 2022/0412499 A1  Dec. 29, 2022

(51) Int. Cl.
| | | |
|---|---|---|
| *F16K 15/03* | (2006.01) | |
| *F16L 55/10* | (2006.01) | |
| *F16L 55/027* | (2006.01) | |
| *F16K 47/02* | (2006.01) | |
| *F16K 47/08* | (2006.01) | |

(52) U.S. Cl.
CPC ........ *F16L 55/1022* (2013.01); *F16K 47/023* (2013.01); *F16K 47/08* (2013.01); *F16L 55/02709* (2013.01); *F16L 55/02727* (2013.01); *F16K 15/038* (2013.01)

(58) Field of Classification Search
CPC ...... F16K 15/038; F16K 47/02; F16K 47/023; F16K 47/08; F16K 47/14; F16L 55/02709; F16L 55/02727
See application file for complete search history.

(56) References Cited

U.S. PATENT DOCUMENTS

| | | | | |
|---|---|---|---|---|
| 2,877,792 A | * | 3/1959 | Tybus | F16K 15/038 |
| | | | | 137/527 |
| 4,691,894 A | * | 9/1987 | Pyotsia | F16K 1/222 |
| | | | | 251/283 |
| 5,465,756 A | | 11/1995 | Royalty et al. | |
| 5,664,760 A | * | 9/1997 | Army, Jr. | F16K 47/08 |
| | | | | 138/44 |
| 6,439,540 B1 | | 8/2002 | Tse | |
| 7,422,029 B2 | * | 9/2008 | Denike | B64D 13/02 |
| | | | | 137/512.1 |

(Continued)

FOREIGN PATENT DOCUMENTS

| | | |
|---|---|---|
| DE | 19846728 A1 | 5/2000 |
| EP | 0438040 A2 | 7/1991 |
| EP | 2751454 B1 | 5/2017 |

*Primary Examiner* — Kevin F Murphy

(74) *Attorney, Agent, or Firm* — Venable LLP; Elizabeth C. G. Gitlin; Michele V. Frank

(57) ABSTRACT

A check valve assembly for a supply pipe. The check valve assembly includes a hinge pin, a first flapper, and a second flapper. The first flapper is pivotally coupled to the second flapper with the hinge pin. The check valve assembly also includes a stopper located between the first flapper and the second flapper. The stopper is configured to limit movement of the first flapper and the second flapper. The check valve assembly further includes a plate assembly located downstream of the stopper. The plate assembly is configured to break vortices formed in a fluid flow across the first flapper and the second flapper.

20 Claims, 14 Drawing Sheets

(56) References Cited

U.S. PATENT DOCUMENTS

| | | | |
|---|---|---|---|
| 9,347,573 B2 | 5/2016 | Feng et al. | |
| 9,644,762 B2 | 5/2017 | Rickis et al. | |
| 9,835,261 B2 * | 12/2017 | Solarz | F16K 27/0227 |
| 10,088,065 B2 | 10/2018 | Olejak | |
| 10,651,485 B2 | 5/2020 | Takeyama | |

* cited by examiner

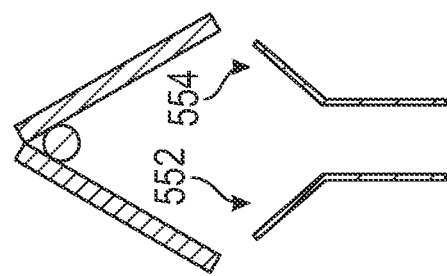
FIG. 7E
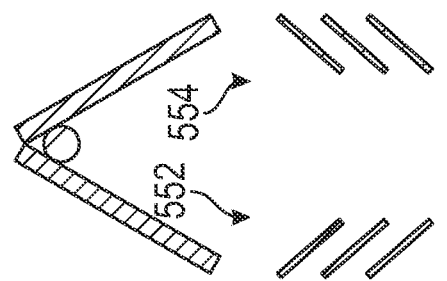
FIG. 7D
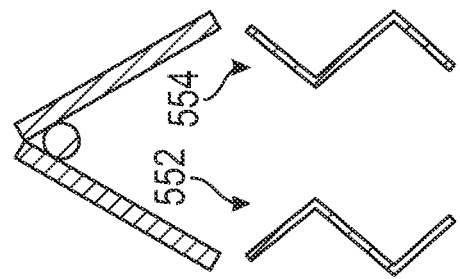
FIG. 7C
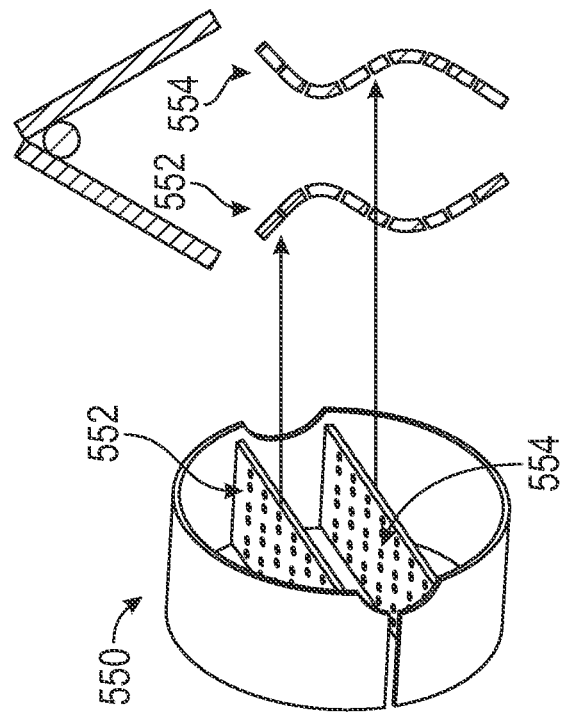
FIG. 7B
FIG. 7A

CHECK VALVE ASSEMBLY

TECHNICAL FIELD

The present disclosure relates to a check valve assembly. In particular, the present disclosure relates to a check valve assembly for a gas turbine engine.

BACKGROUND

Gas turbine engines utilize check valves in supply pipes, such as, for example, air and fuel supply pipes. The check valves in supply pipes may protect against fluid loss in the event of a broken pipe. Traditional check valves may include a flapper configured to open and to close a passage through the pipe.

BRIEF SUMMARY

According to an embodiment, a check valve assembly for a supply pipe may include a hinge pin; a first flapper and a second flapper, the first flapper pivotally coupled to the second flapper with the hinge pin; a stopper located between the first flapper and the second flapper, the stopper being configured to limit movement of the first flapper and the second flapper; and a plate assembly located downstream of the stopper, the plate assembly being configured to break vortices formed in a fluid flow across the first flapper and the second flapper.

According to an embodiment, a pipe for a gas turbine engine may include a check valve having two flappers hingedly coupled with a pin; and a perforated plate located downstream of the check valve, the perforated plate being aligned parallel with a direction of a fluid flow through the pipe, and the perforated plate being configured to break vortices formed in the fluid flow through the pipe.

Additional features, advantages, and embodiments of the present disclosure are set forth or apparent from a consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 7A shows a perspective view of a shell for a check valve assembly, according to an embodiment of the present disclosure.

FIG. 7B shows a schematic view of a plate for a shell of a check valve assembly, according to an embodiment of the present disclosure.

FIG. 7C shows a schematic view of a plate for a shell of a check valve assembly, according to an embodiment of the present disclosure.

FIG. 7D shows a schematic view of a plate for a shell of a check valve assembly, according to an embodiment of the present disclosure.

FIG. 7E shows a schematic view of a plate for a shell of a check valve assembly, according to an embodiment of the present disclosure.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

The check valve assemblies of the present disclosure may include two flappers pivotally coupled with a pin. The check valve assemblies of the present disclosure may include a plate assembly for reducing flapper flutter. Flapper flutter may be oscillations or fluttering of the flappers in the check valve. The plate assemblies may thus prolong the life of the check valve by reducing wear on the flapper caused by the flapper flutter. The check valve assemblies of the present disclosure may reduce vortex shedding and pressure fluctuations in the flow presented at the flapper of the check valve. The check valve assemblies of the present disclosure may include one or more perforated plates secured to an interior of the pipe. The perforated plates may reduce vortex shedding and pressure fluctuations in the flow. Various retention systems are described herein for securing the perforated plates within the pipe.

Figure 1:
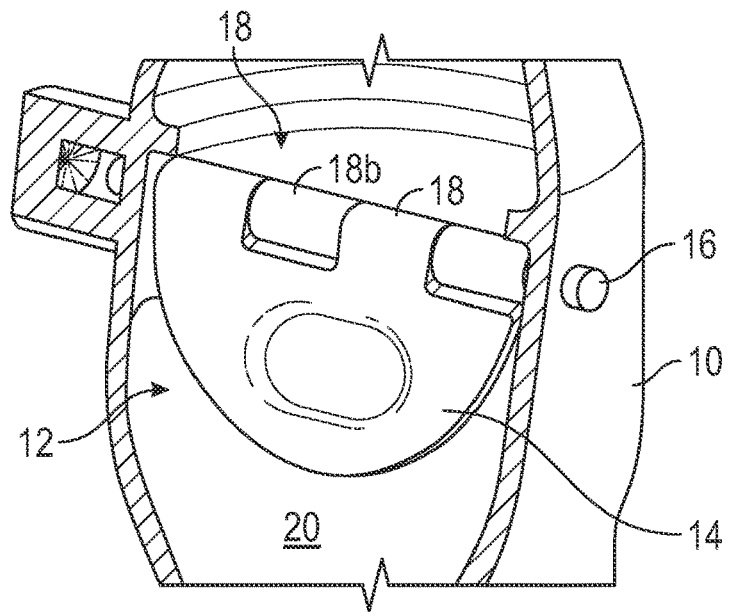
FIG. 1 shows a partial perspective cross-sectional view of a pipe with a check valve taken along a centerline of the pipe, according to an embodiment of the present disclosure.

FIG. 1 shows a pipe 10 having a check valve 12. The pipe 10 may be a supply pipe or other pipe in a gas turbine engine. The check valve 12 may include a flapper 14 and a pin 16. The flapper 14 may include two semi-circular portions 18: a first semi-circular portion 18*a* and a second semi-circular portion 18*b*. The semi-circular portions 18 may also referred to as flappers, such that, the first semi-circular portion 18*a* is a first flapper and the second semi-circular portion 18*b* is a second flapper. The flapper 14 may be coupled or directly connected to and may pivot about the pin 16. Although described as a pin, the pin 16 may be any hinge device for allow pivoting or rotation of the semi-circular portions 18. The check valve 12 may be movable or positionable between a closed position (not shown) blocking flow through the passage 20 through the pipe 10 and an open position, shown in FIG. 1, allowing flow through the passage 20.

Flow through the pipe 10 may cause the flapper 14 (e.g., each of the first semi-circular portion 18*a* and the second semi-circular portion 18*b*) to flutter. For example, the two semi-circular portions 18 may oscillate back and forth due to the flow of fluid past the two semi-circular portions 18. The flutter on the flapper 14 may cause wear on the flapper. The wear on the flapper 14 may lead to failure of the check valve 12 and/or failure of the pin 16. The flutter may be present in two main forms. First, the flapper flutter may be present as vortex shedding at a steady state operation of the engine. That is, at the distal end of curved sides of the two semi-circular portions 18, vortices may form that cause the flapper 14 to flutter. The second form may be present as momentary manifold pressure imbalance and/or rebalance during a transient engine condition.

The check valve assemblies described herein may include a plate assembly that may reduce flutter by reducing the vortex shedding. The perforated plates of the plate assembly may destroy vortices formed at the flapper ends, thereby reducing pressure fluctuations across the flapper plates (e.g., the two semi-circular portions 18). The perforated plates may allow for a reduction in pressure fluctuation in the two semi-circular portions downstream of the check valve due to the plate assembly of the present disclosure. In some examples, the reduction in pressure fluctuation may be as much as 57%. In some examples, the reduction in pressure may be greater than 40%, greater than 50%, or greater than 60%.

Figure 2A:
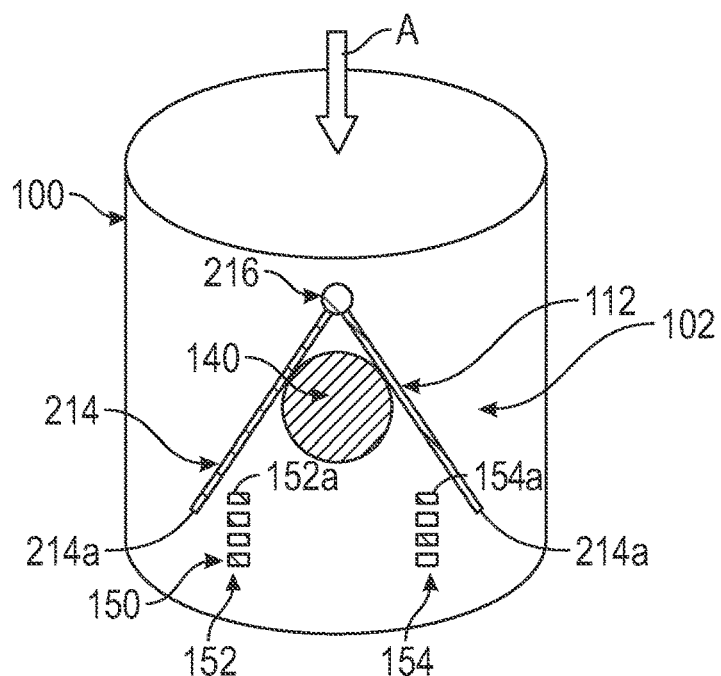
FIG. 2A shows a schematic view of a pipe with a check valve assembly, according to an embodiment of the present disclosure.

FIG. 2A shows a schematic of a pipe 100 of the present disclosure. The pipe 100 may include a check valve assembly 102. The check valve assembly 102 may include a check valve 112, a stopper 140, and a plate assembly 150. The check valve 112 may be the same as, or similar to, the check valve 12. For example, the check valve 112 may include a flapper 214 and a pin 216. The stopper 140 may be a cylindrical component or a rod shaped component. The stopper 140 may limit movement of the flapper 214 and may operate to prevent the flapper 214 from opening past a predetermined position. That is, when the flapper 214 is in the maximum open position (e.g., the position shown in FIG. 2A), an inner surface of each semi-circular portion of the flapper 214 may contact the stopper 140 to prevent further movement thereof.

With continued reference to FIG. 2A, the plate assembly 150 may include a first plate 152 and a second plate 154. The plate assembly 150 may be arranged downstream of the check valve 112. That is, a fluid flow A may first flow through the pipe 100 past the check valve prior to the plate assembly 150. Although shown with a longitudinal overlap between the distal ends 214*a* of the semi-circular portions of the flapper 214 and the first plate 152 and the second plate 154, no longitudinal overlap may be present. That is, in some examples, a first plate upper surface 152*a* and a second plate upper surface 154*a* may be spaced a distance from the distal ends 214*a* of the semi-circular portions of the flapper 214. The first plate 152 and the second plate 154 may be secured to an interior surface of the pipe 100 at distal ends thereof. The first plate 152 and the second plate 154 may be placed with a longitudinal axis that is parallel to the central, longitudinal axis of the stopper 140. The plate assembly 150 may be secured to a wall of the pipe 100. Described herein are exemplary methods and systems for securing the plate assembly 150 to the pipe 100.

Figure 2B:
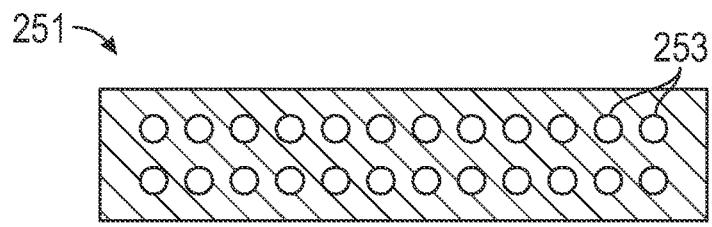
FIG. 2B shows a schematic view of a plate for a check valve assembly, according to an embodiment of the present disclosure.

FIG. 2B shows an exemplary plate 251. The plate 251 may be provided in the plate assembly 150 as the first plate 152, the second plate 154, or both the first plate 152 and the second plate 154. The plate 251 may include openings 253. The openings 253 may extend vertically and horizontally across the plate 251 in an array. The openings 253 may define the plate 251 as a perforated plate. Accordingly, the first plate 152 and/or the second plate 154 may be defined as perforated plates. The openings 253 may be aligned along the plate 251 in a direction that is parallel to the flow A (FIG. 2B). This may also be described as having a central, longitudinal axis of the openings 253 normal to the flow A (FIG. 2B). Referring back to FIG. 2A, the orientation of the openings 253 parallel to the flow A is shown.

The plate 251, e.g., the perforated plate, may break vortices as the vortices are formed in the flow traveling across the plate 251. The plate 251 may lower transient imbalances in the pressure present in the flow. Thus, the plate 251 may allow for reduction of vortex shedding across the flappers 214 or prevention of the vortex shedding across the flappers 214. The plate 251 may reduce instabilities and fluctuations in the flow of fluid through the pipe 100. This may provide wear resistance to the flappers 214 and prolong the life of the flappers 214, and, thus, the life of the check valve 112. Vortex shedding across the flappers 214 may be stopped by using a flat, perforated plate such as the plate 251. The plate 251 may be a thin plate with holes (e.g., openings 253). The plate 251 may be welded to an interior surface of the pipe 100 at distal ends of the plate 251.

FIGS. 3A to 16B show exemplary plate assemblies and retention systems for coupling a plate assembly to a pipe. Any portion of the plate assemblies and/or retention systems described herein or all of the plate assemblies and/or retention systems described herein may be used with any portion of or all of the plate assemblies, retention systems, and/or pipes described herein. The perforated plate, e.g., plate 251, described in FIG. 2B may be employed in any of the plate assemblies described herein.

Figure 3A:
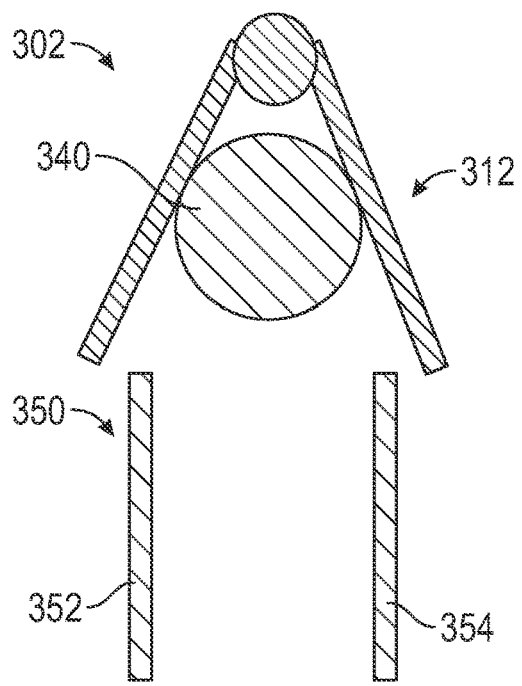
FIG. 3A shows a schematic view of a check valve assembly, according to an embodiment of the present disclosure.
Figure 3B:
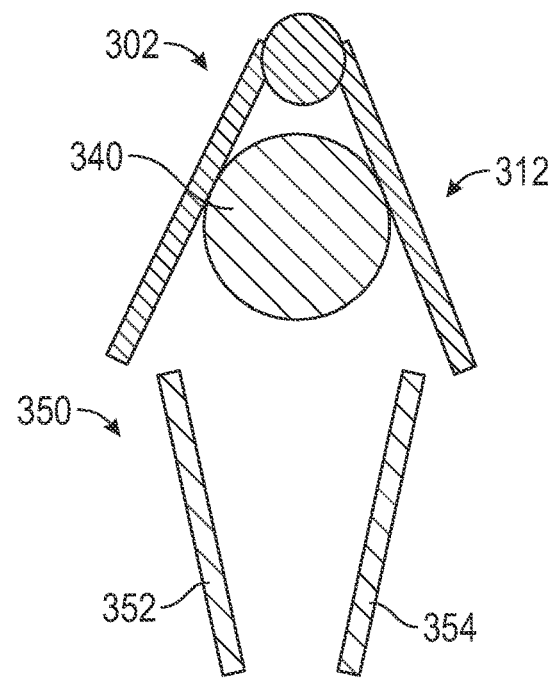
FIG. 3B shows a schematic view of a check valve assembly, according to an embodiment of the present disclosure.

FIGS. 3A and 3B show schematic views of a check valve assembly 302. The check valve assembly 302 may be the same as, or similar to, any of the check valve assemblies described herein. That is, the check valve assembly 302 may include a check valve 312, a stopper 340, and a plate assembly 350, any of which may be the same as, or similar to, like components described herein. The plate assembly 350 may include a first plate 352 and a second plate 354. In FIG. 3A, the first plate 352 and the second plate 354 may be parallel. In FIG. 3B, the first plate 352 and the second plate 354 may be nonparallel. The first plate 352 and the second plate 354 of FIG. 3B may be converging. That is, a downstream end of the first plate 352 and a downstream end of the second plate 354 may be angled toward one another. Other arrangements of the plate assembly 350 are contemplated, such as, for example, those embodiments shown in FIGS. 7B to 7E.

Figure 4:
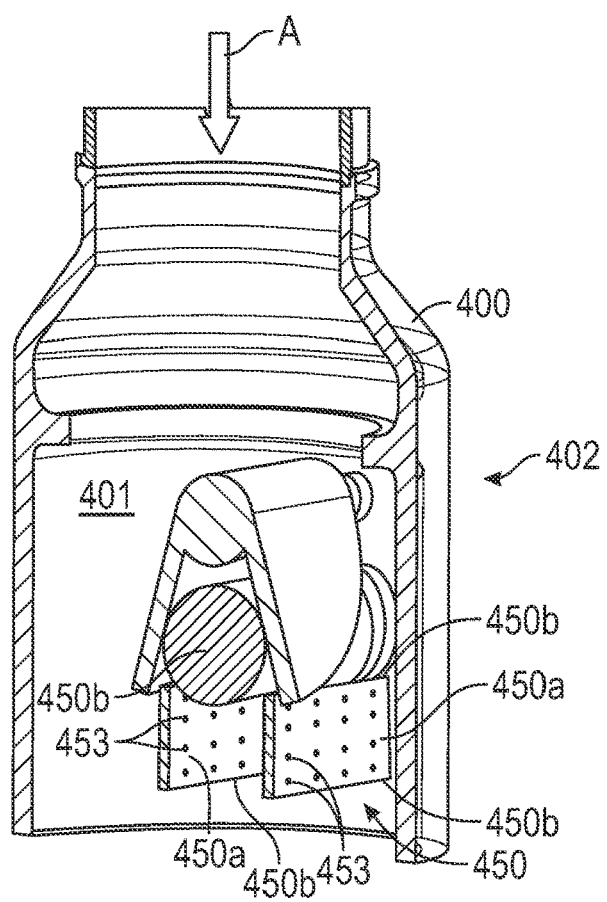
FIG. 4 shows a partial perspective cross-sectional view of a pipe with a check valve assembly taken along a centerline of the pipe, according to an embodiment of the present disclosure.

FIG. 4 shows an exemplary view of a pipe 400 with a check valve assembly 402 secured therein. The check valve assembly 402 may be the same as, or similar to, any of the check valve assemblies described herein. The plate assembly 450 of the check valve assembly 402 may be secured such that the plates extend normal to a fluid flow A flowing through an interior 401 of the pipe 400. The interior 401 may also be referred to as a bore or a passage. The plate assembly 450 may be welded to an inner surface of the pipe 400. For example, each plate of the plate assembly 450 may be welded, at each distal end of the plate, to the interior surface of the pipe 400. Each plate of the plate assembly 450 may have a first surface 450*a*. The first surface 450*a* may be the surface on which the plurality of perforations or openings 453 are located. The first surface 450*a* may be oriented such that the first surface 450*a*, and, thus, the openings 453, are aligned in the direction of flow. A side surface 450*b* of each plate of the plate assembly 450 may be oriented normal to the fluid flow A.

Figure 5A:
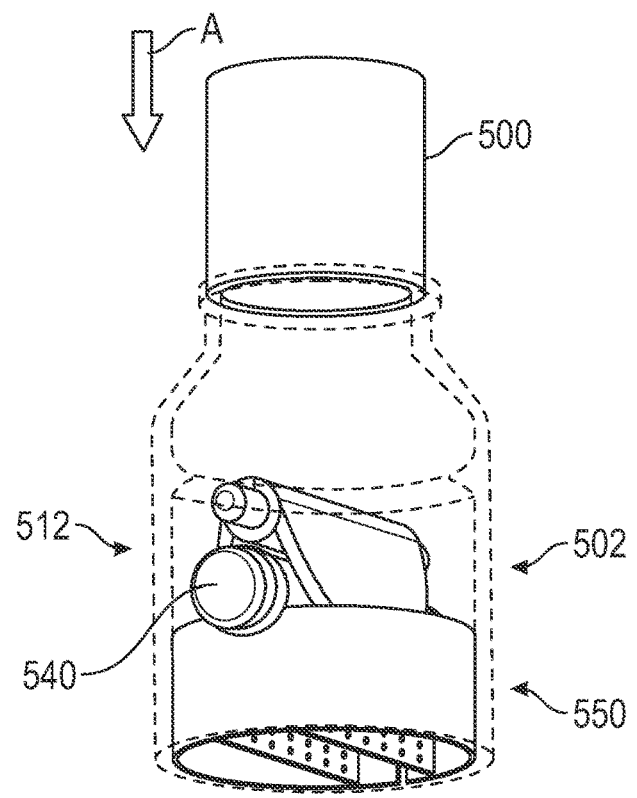
FIG. 5A shows a perspective view of a pipe with a check valve assembly, according to an embodiment of the present disclosure.
Figure 5B:
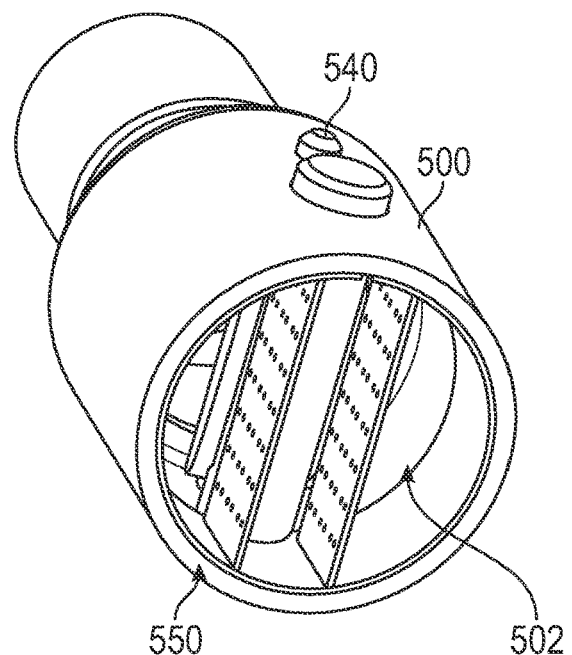
FIG. 5B shows a perspective view of the pipe of FIG. 5A, according to an embodiment of the present disclosure.
Figure 5C:
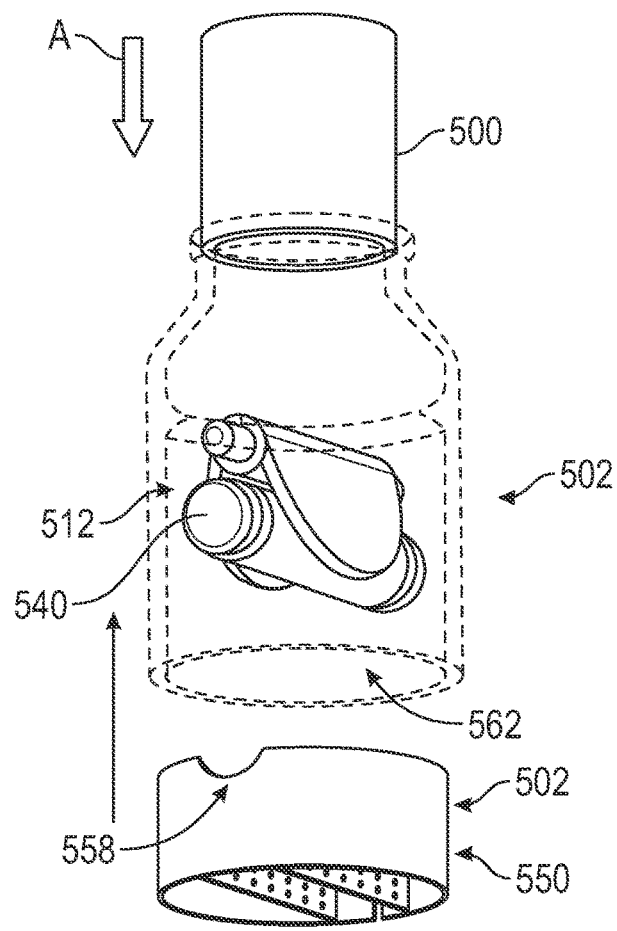
FIG. 5C shows a partial exploded view of the pipe of FIG. 5A, according to an embodiment of the present disclosure.

FIGS. 5A to 5C show a pipe 500 with a check valve assembly 502 secured therein. The check valve assembly 502 may be the same as, or similar to, any of the check valve assemblies described herein. That is, the check valve assembly 502 may include a check valve 512, a stopper 540, and a plate assembly 550, any of which may be the same as, or similar to, like components described herein. The plate assembly 550 may include perforated plates (e.g., plate 251 of FIG. 2B and 552 of FIG. 6) that are connected to a shell 556 (FIG. 6) and inserted into a downstream end of the pipe 500, e.g., an end of the pipe that is downstream of the check valve 512.

Figure 6:
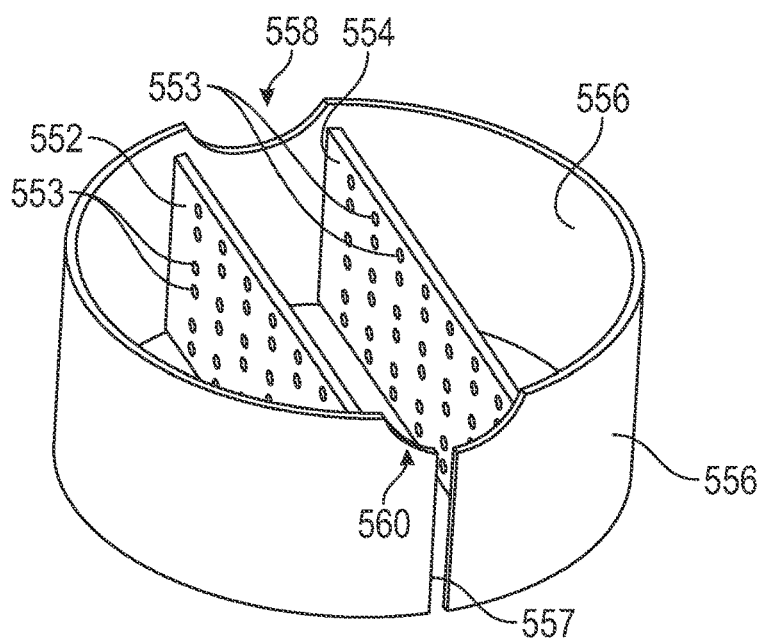
FIG. 6 shows a perspective view of a shell for a check valve assembly, according to an embodiment of the present disclosure.

The plate assembly 550 is shown in more detail in FIG. 6. The plate assembly 550 may include a first plate 552, a second plate 554, and a shell 556. The first plate 552 and the second plate 554 may be secured within the shell 556. The first plate 552 and the second plate 554 may be arranged in parallel. Alternatively, the first plate 552 and the second plate 554 may be arranged in other configurations such as, for example, those shown in FIGS. 7B to 7E. The first plate 552 may include a plurality of perforations, also referred to as a plurality of openings 553. The second plate 554 may include a plurality of openings 553. The plurality of openings 553 may be aligned in the direction of fluid flow A.

With continued reference to FIG. 6, the shell 556 may be cylindrical or tubular in shape. The shell 556 may be a split shell or a split ring. For example, the shell 556 may include an opening 557 in the wall of the shell 556. The opening 557 may allow for a split shell arrangement to create pre-strain for the plate assembly 550. The pre-strain may allow for allow for securing the shell 556 within the pipe 500 with a press fit. The shell 556 may include a first cutout 558 and a second cutout 560. The first cutout 558 and the second cutout 560 (FIG. 6) may be arranged to accommodate opposing ends of the stopper 540. The first cutout 558 and/or the second cutout 560 may be anti-rotation features that may lock on the stopper 540 to ensure a parallel orientation between the stopper 540 and the first plate 552 and the second plate 554.

Referring again to FIG. 5C, the shell 556 may be inserted into an opening 562 of the pipe 500 located downstream of the check valve 512. The first cutout 558 and the second cutout 560 may be aligned with opposed distal ends of the stopper 540. In the installed position (e.g., FIG. 5A), the distal ends of the stopper 540 may rest or be located within the first cutout 558 and the second cutout 560.

FIG. 7A shows the plate assembly 550 with parallel plates, e.g., the first plate 552 being parallel with the second plate 554. Other arrangements of the plates are considered, as shown in FIGS. 7B to 7E, which depict schematics of plate arrangements, as shown from an end view of the plates. In FIG. 7B, the first plate 552 and the second plate 554 may be curved to guide the flow through the pipe. The first plate 552 and the second plate 554 may each curve toward and away from a central, longitudinal axis of the plate assembly 550 to form flow guided plates. FIG. 7C shows a first plate 552 and a second plate 554 that converge and diverge from each other to form a converging/diverging plate assembly as shown in FIG. 7C. FIG. 7D shows the first plate 552 and the second plate 554 arranged at an angle with respect to the central, longitudinal axis of the plate assembly 550. The first plate 552 and the second plate 554 may be arranged as angular baffles. In FIG. 7E, the first plate 552 and the second plate 554 may together form a funnel baffle. Although described as alternatives to the first plate 552 and the second plate 554 of FIG. 7A, the alternatives shown in FIGS. 7B to 7E may be applied to other plate assemblies described herein. The alternatives shown in FIGS. 7B to 7E may be combined.

Figure 8A:
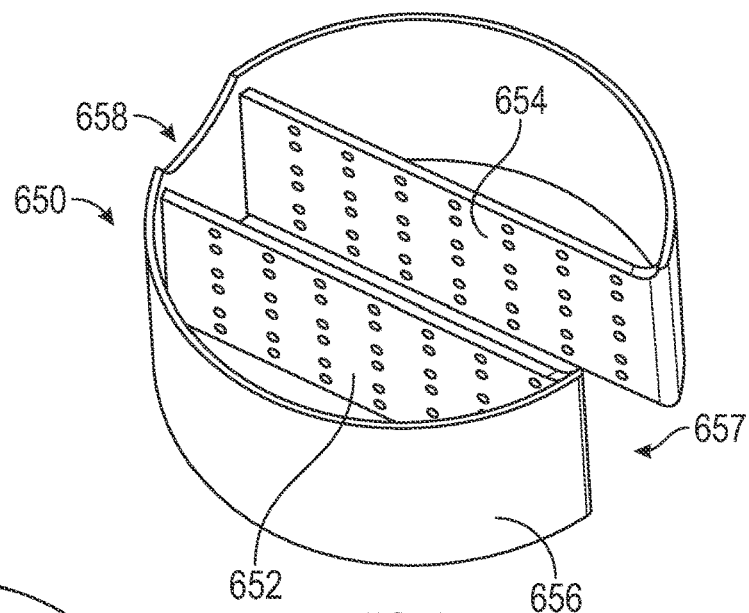
FIG. 8A shows a perspective view of a shell for a check valve assembly, according to an embodiment of the present disclosure.
Figure 8B:
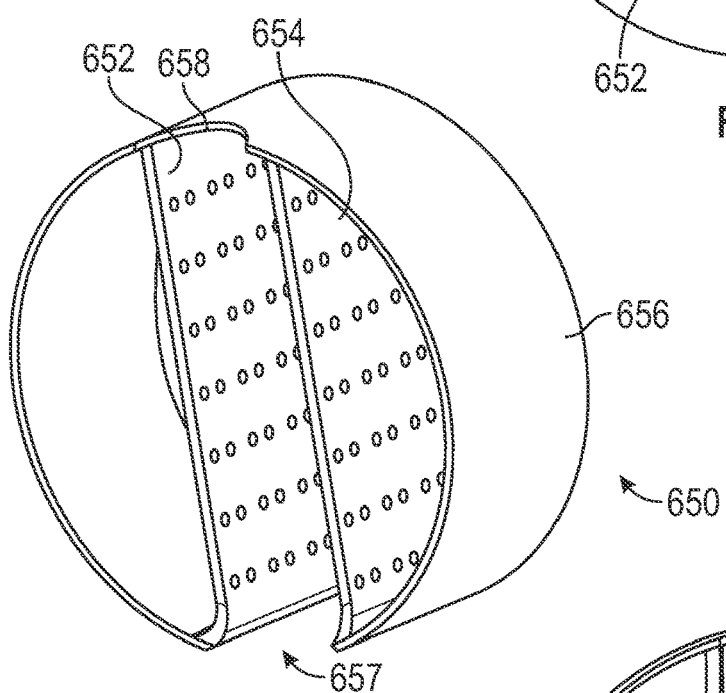
FIG. 8B shows a perspective view of the shell of FIG. 8A, according to an embodiment of the present disclosure.
Figure 8C:
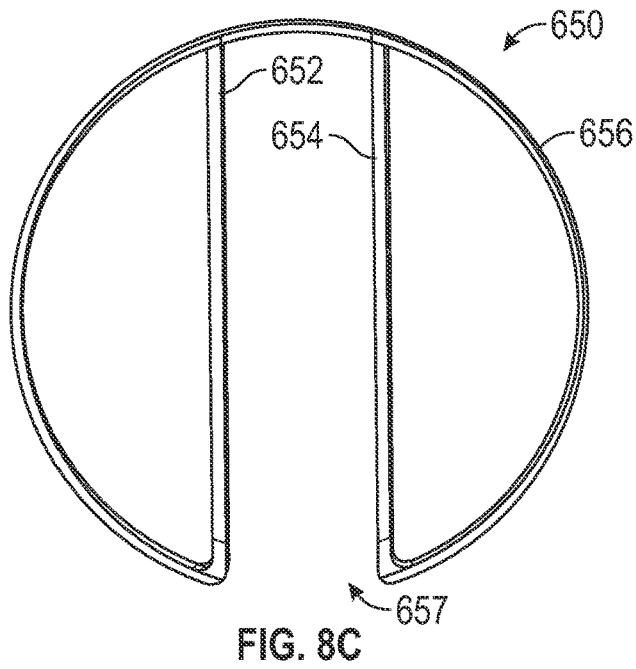
FIG. 8C shows an end view of the shell of FIG. 8A, according to an embodiment of the present disclosure.

FIGS. 8A to 8C show a plate assembly 650. The plate assembly 650, and subcomponents thereof, may be similar to the plate assembly 550 shown in FIG. 5C. In the plate assembly 650, a shell may form a tubular or a cylindrical shape to form a cylindrical shell 656. The cylindrical shell 656 may include an opening 657 in the cylindrical shell 656 located between a first plate 652 and a second plate 654. In FIG. 6, the opening 557 is a narrow slit and the walls of the shell 556 extend past the radially innermost surface of each of the first plate 552 and the second plate 554. In FIGS. 8A to 8C, the opening 657 is larger than the opening 557. The opening 657 is created by the first plate 652 and the second plate 654 such that each of the first plate 652 and the second plate 654 form a wall of the cylindrical shell 656. A cutout 658 may be present in the cylindrical wall of the cylindrical shell 656. The cutout 658 may be configured to receive an end of a stopper of a check valve assembly, similar to that shown in FIG. 5A.

Figure 9A:
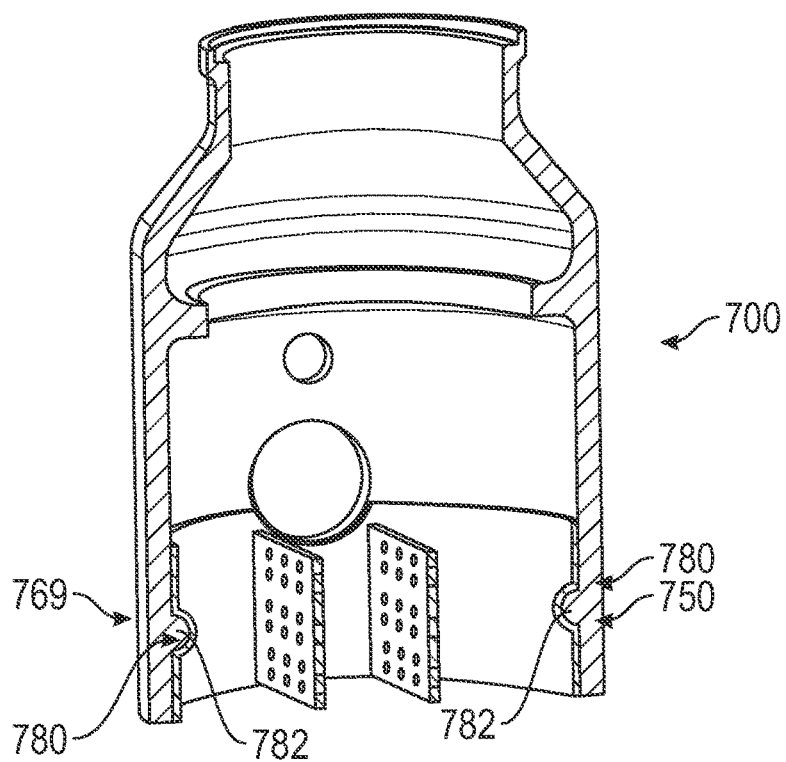
FIG. 9A shows a partial perspective cross-sectional view of a pipe with a check valve assembly taken along a centerline of the pipe, according to an embodiment of the present disclosure.
Figure 9B:
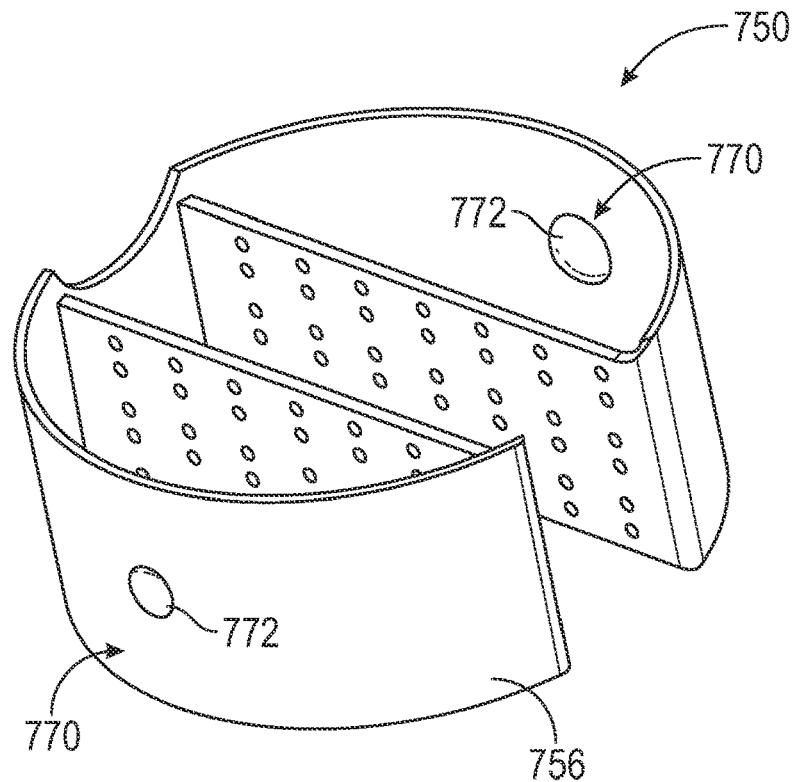
FIG. 9B shows a perspective view of a shell for the check valve assembly of FIG. 9A, according to an embodiment of the present disclosure.

FIGS. 9A and 9B show a plate assembly 750 coupled to a pipe 700 with a retention system 769. The plate assembly 750 may be the same as or similar to any of the plate assemblies described herein. The retention system 769 may include a first retention device 770 on the plate assembly 750 and a second retention device 780 on the pipe 700. The first retention device 770 may be configured to secure the plate assembly 750 to the pipe 700. The first retention device 770 may include one or more indentations 772 in an outer surface of the shell 756 of the plate assembly 750. The first retention device 770 may engage with or interact with the corresponding second retention device 780 on the pipe 700. The second retention device 780 may include one or more protrusions 782 on an inner surface of the pipe 700. When assembled, the indentations 772 may receive the protrusions 782 such that the shell 756 of the plate assembly 750 is secured to the pipe 700. Although two indentations 772 and two protrusions 782 are shown, more or fewer may be provided. The number of indentations 772 may equal the number of protrusions 782.

Figure 10A:
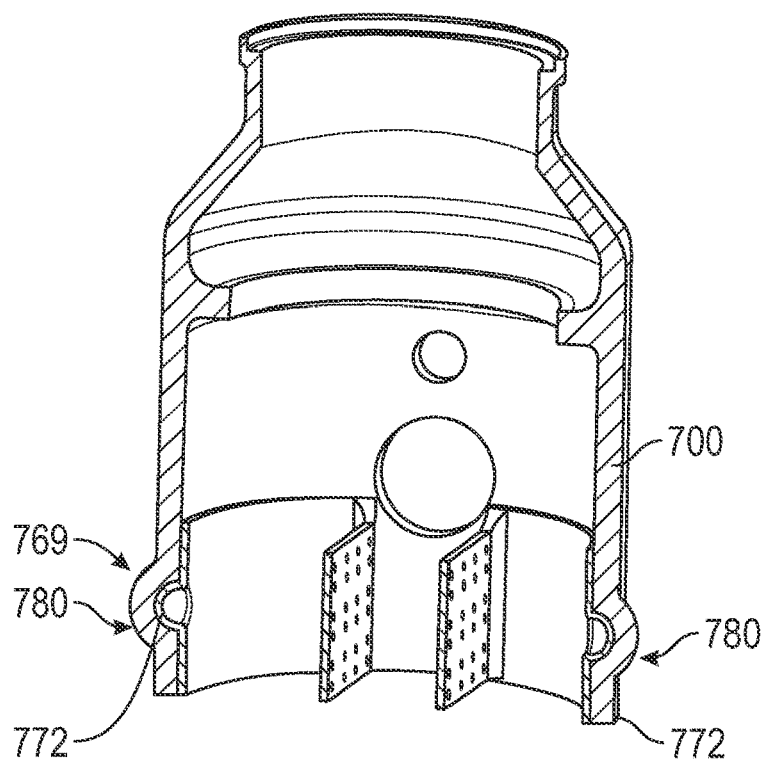
FIG. 10A shows a partial perspective cross-sectional view of a pipe with a check valve assembly taken along a centerline of the pipe, according to an embodiment of the present disclosure.
Figure 10B:
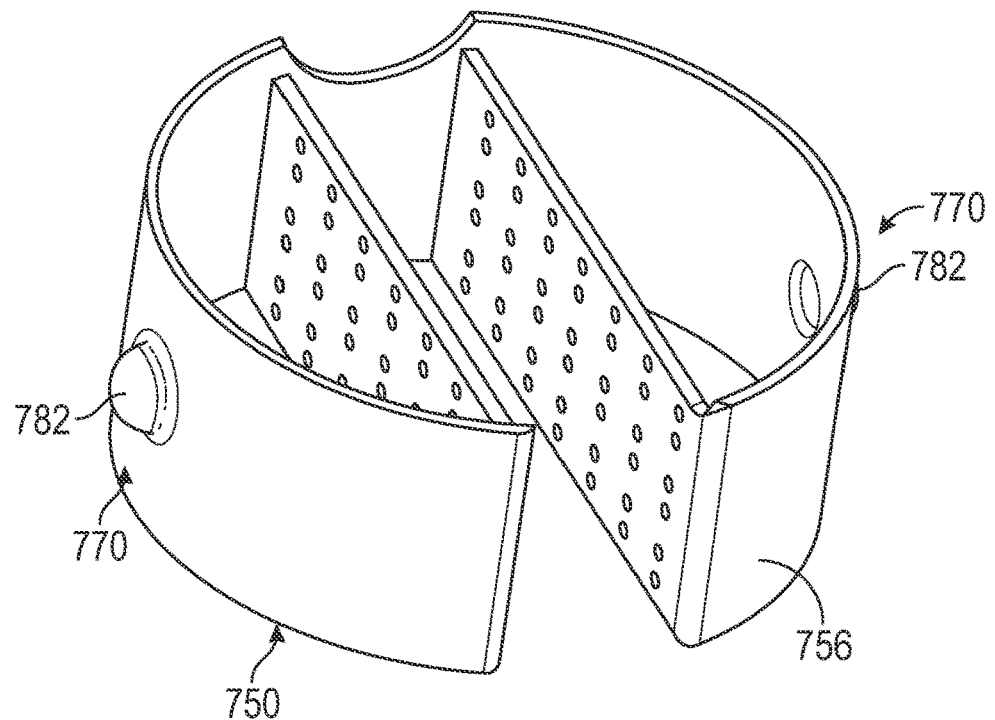
FIG. 10B shows a perspective view of a shell for the check valve assembly of FIG. 10A, according to an embodiment of the present disclosure.

In the example of FIGS. 10A and 10B, the indentations 772 and protrusions 782 of the retention system 769 may have reversed locations. In this manner, the first retention device 770 of the plate assembly 750 includes protrusions 782 on an outer surface of the plate assembly 750 and the second retention device 780 on the pipe 700 includes indentations 772 on an inner surface of the pipe 700. When assembled, the indentations 772 may receive the protrusions 782 such that the shell 756 of the plate assembly 750 is secured to the pipe 700.

Figure 11A:
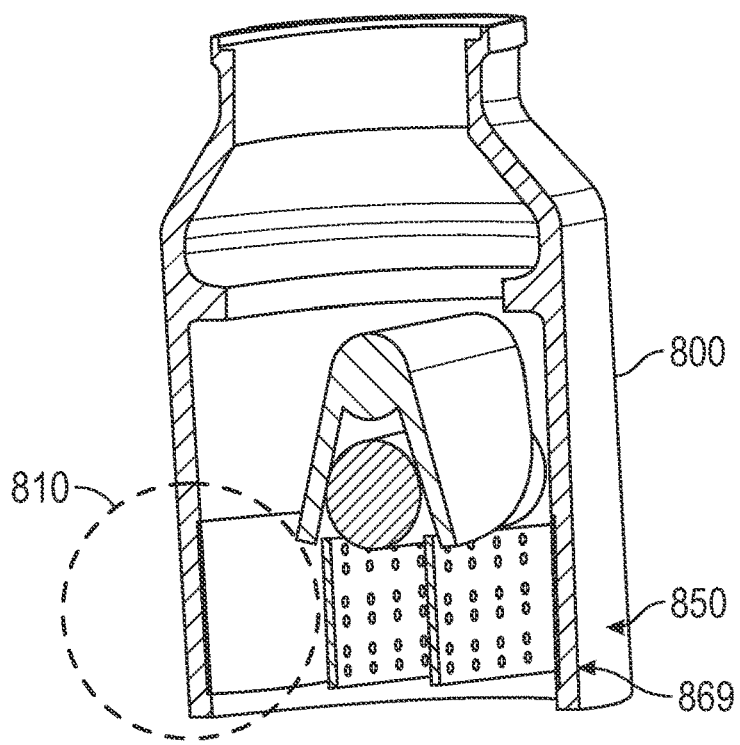
FIG. 11A shows a partial perspective cross-sectional view of a pipe with a check valve assembly taken along a centerline of the pipe, according to an embodiment of the present disclosure.
Figure 11B:
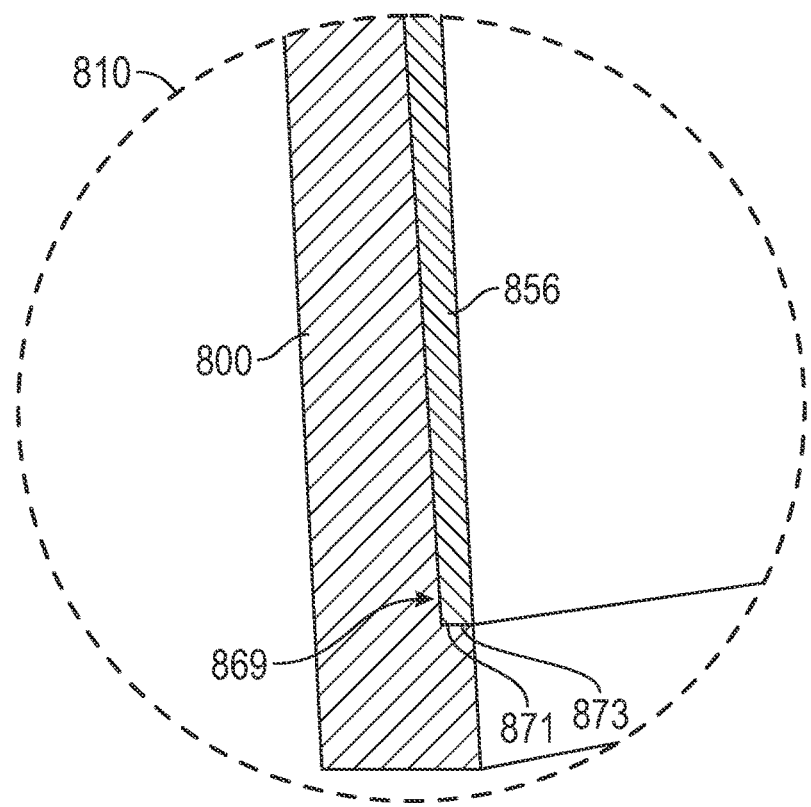
FIG. 11B shows an enlarged view of a shell for the check valve assembly of FIG. 11A, according to an embodiment of the present disclosure.

FIGS. 11A and 11B show an exemplary retention system 869 for coupling a plate assembly 850 to a pipe 800. FIG. 11B shows an enlarged portion 810 of the retention system 869. The plate assembly 850 may be the same as or similar to any of the plate assemblies described herein. The retention system 869 may include a first surface 871 on the pipe 700 and a second surface 873 on a shell 856 of the plate assembly 850. The first surface 871 may be an upper surface of a shoulder on the pipe 800. The second surface 873 may be a lower surface on the shell 856 of the plate assembly 850. When assembled, the second surface 873 may rest or contact the first surface 871. In this manner, the shell 856 of the plate assembly 850 may be maintained within or secured within the pipe 800 due to the interaction between the first surface 871 and the second surface 873.

Figure 12A:
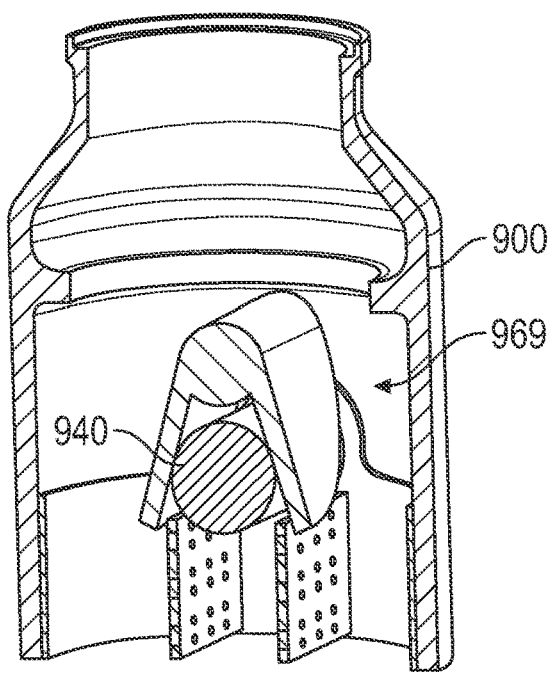
FIG. 12A shows a partial perspective cross-sectional view of a pipe with a check valve assembly taken along a centerline of the pipe, according to an embodiment of the present disclosure.
Figure 12B:
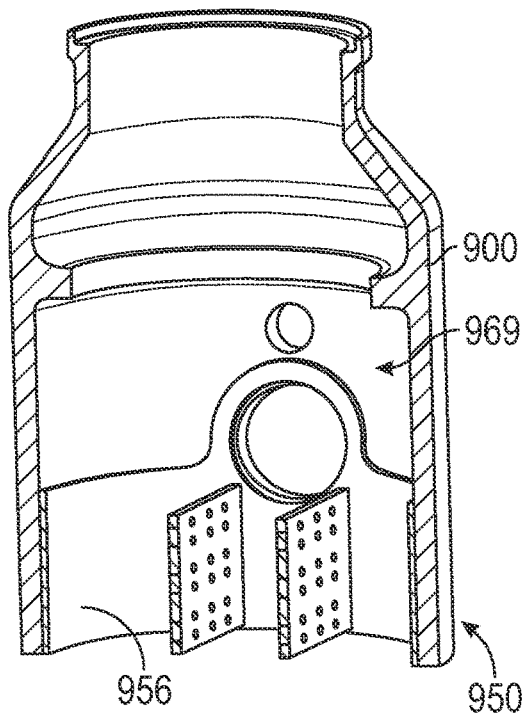
FIG. 12B shows a partial perspective cross-sectional view of the pipe of FIG. 12A, taken along a centerline of the pipe, according to an embodiment of the present disclosure.
Figure 12C:
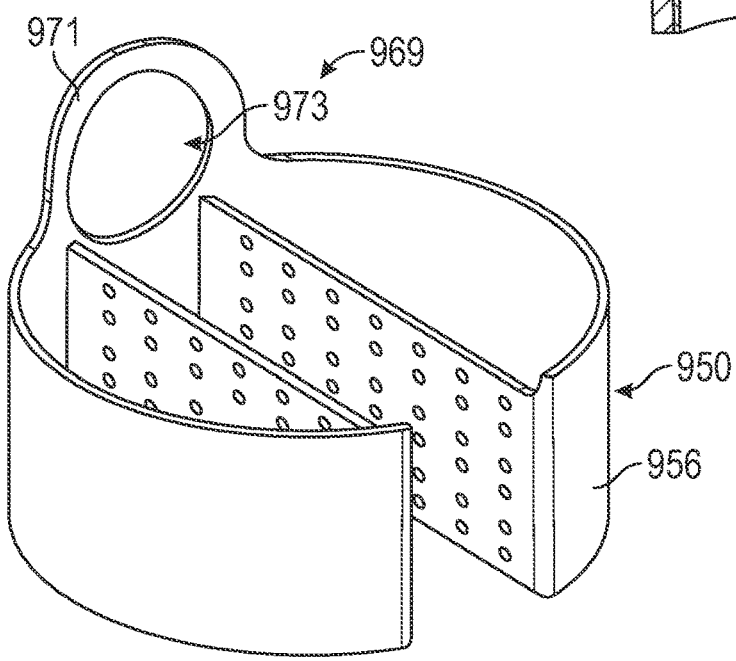
FIG. 12C shows a perspective view a shell for the check valve assembly of FIG. 12A, according to an embodiment of the present disclosure.

FIGS. 12A to 12C show an exemplary retention system 969 for coupling a plate assembly 950 to a pipe 900. The plate assembly 950 may be the same as or similar to any of the plate assemblies described herein. The retention system 969 may include a ring 971 on a shell 956 of the plate assembly 950. The retention system 969 may include the stopper 940. The stopper 940 may be received within or fit within an opening 973 of the ring 971. When assembled, the opening 973 may receive the stopper 940 such that the plate assembly 950 may be maintained within or secured within the pipe 900 due to the interaction between the ring 971 and the stopper 940. Thus, the shell 956 of the plate assembly 950 may be maintained within or secured within the pipe 900 due to the interaction between the ring 971 and the stopper 940.

Figure 13A:
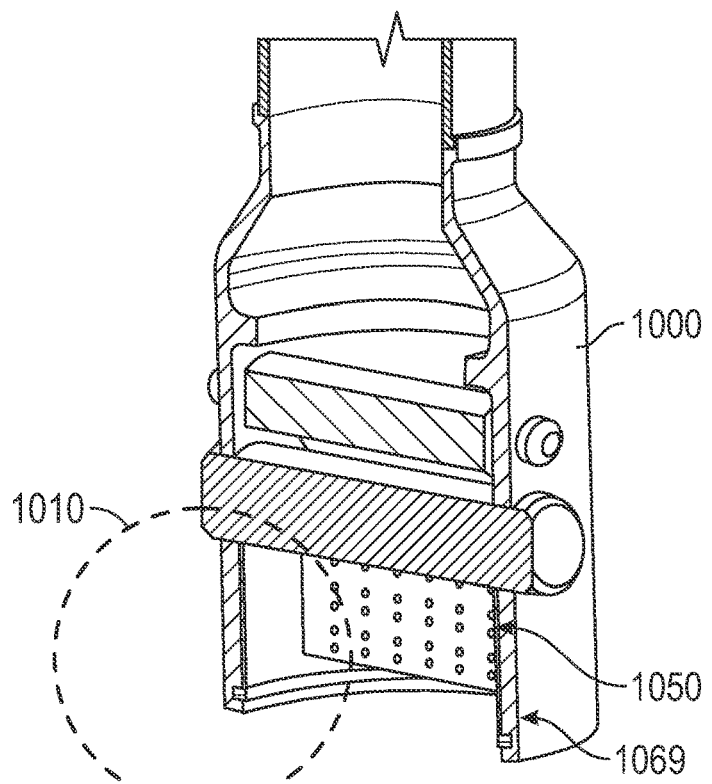
FIG. 13A shows a partial perspective cross-sectional view of a pipe with a check valve assembly taken along a centerline of the pipe, according to an embodiment of the present disclosure.
Figure 13B:
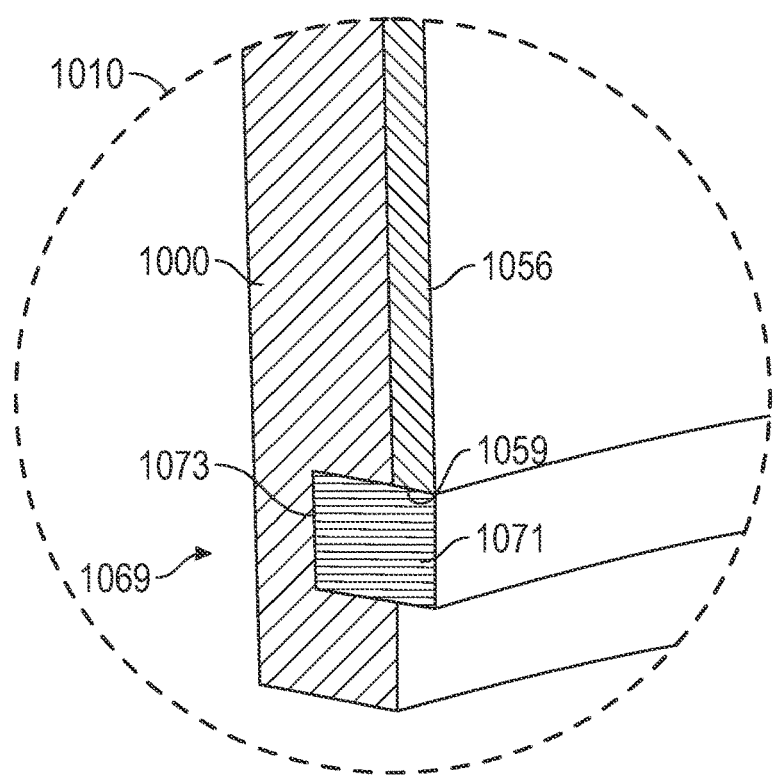
FIG. 13B shows an enlarged view of a shell for the check valve assembly of FIG. 13A, according to an embodiment of the present disclosure.

FIGS. 13A and 13B show an exemplary retention system 1069 for coupling a plate assembly 1050 to a pipe 1000. FIG. 13B shows an enlarged portion 1010 of the retention system 1069. The plate assembly 1050 may be the same as or similar to any of the plate assemblies described herein. The retention system 1069 may include a groove or slot 1073 in the pipe 1000. The retention system 1069 may include a retaining ring 1071. The retention system 1069 may include a surface 1059 on a shell 1056 of the plate assembly 1050. When assembled, the retaining ring 1071 may be received within the slot 1073. The surface 1059 may be a lower surface of the shell 1056. The surface 1059 may rest on an upper surface of the retaining ring 1071. Thus, the shell 1056 of the plate assembly 1050 may be maintained within or secured within the pipe 1000 due to the interaction between the retaining ring 1071 and the surface 1059.

Figure 14A:
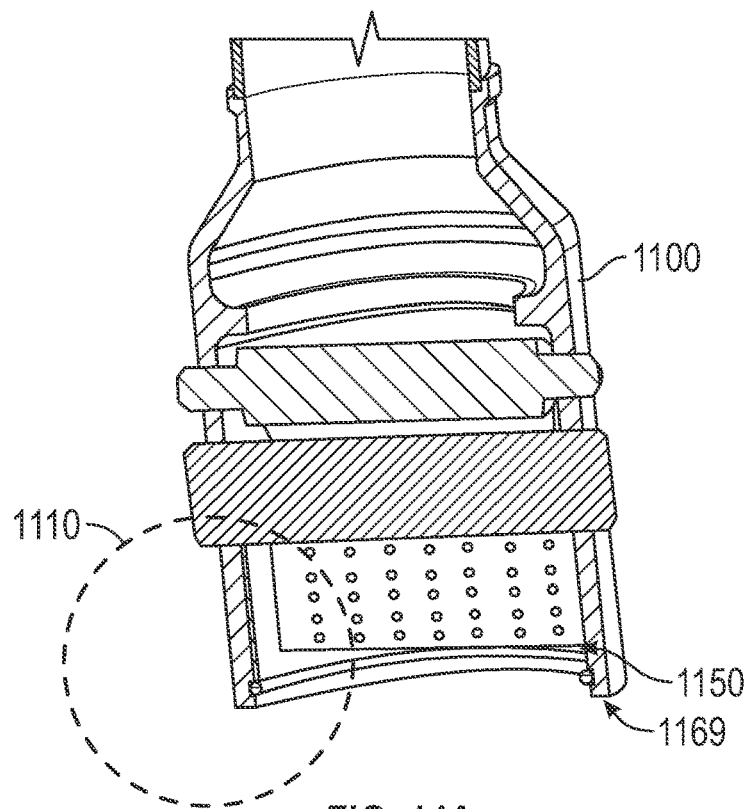
FIG. 14A shows a partial perspective cross-sectional view of a pipe with a check valve assembly taken along a centerline of the pipe, according to an embodiment of the present disclosure.
Figure 14B:
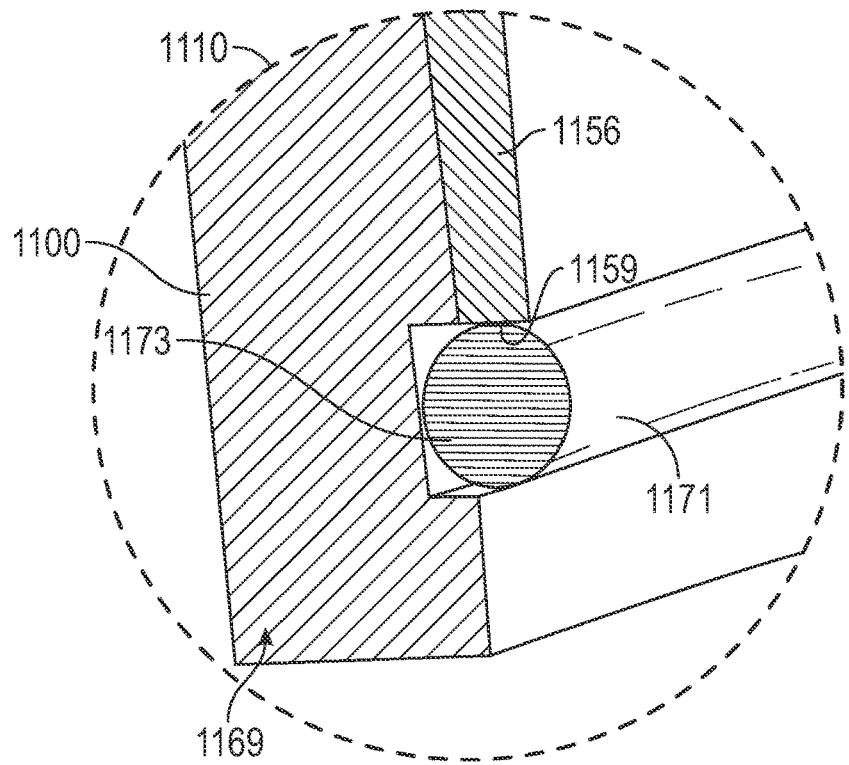
FIG. 14B shows an enlarged view of a shell for the check valve assembly of FIG. 14A, according to an embodiment of the present disclosure.

FIGS. 14A and 14B show an exemplary retention system 1169 for coupling a plate assembly 1150 to a pipe 1100. FIG. 14B shows an enlarged portion 1110 of the retention system 1169. The plate assembly 1150 may be the same as or similar to any of the plate assemblies described herein. The retention system 1169 may include a groove or slot 1173 in pipe 1100. The retention system 1169 may include an O-ring 1171. The retention system 1169 may include a surface 1159 on a shell 1156 of the plate assembly 1150. When assembled, the O-ring may be received within the slot 1173. The surface 1159 may be a lower surface of the shell 1156. The surface 1159 may rest on an upper surface of the O-ring 1171. Thus, the shell 1156 of the plate assembly 1150 may be maintained within or secured within the pipe 1100 due to the interaction between the O-ring and the surface 1159.

Figure 15A:
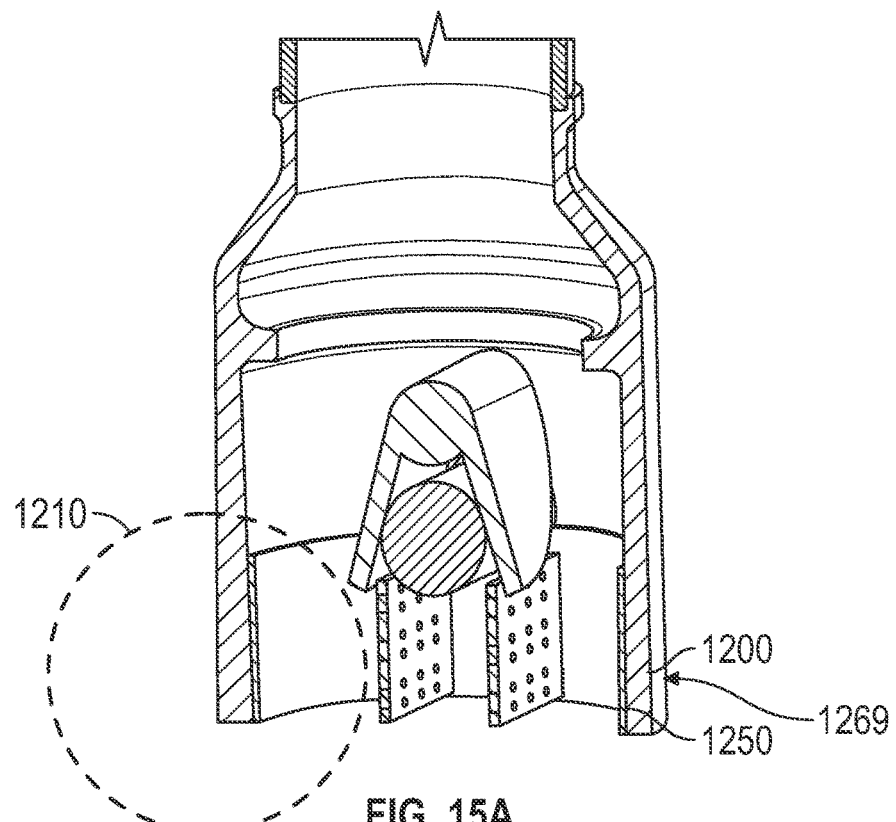
FIG. 15A shows a partial perspective cross-sectional view of a pipe with a check valve assembly taken along a centerline of the pipe, according to an embodiment of the present disclosure.
Figure 15B:
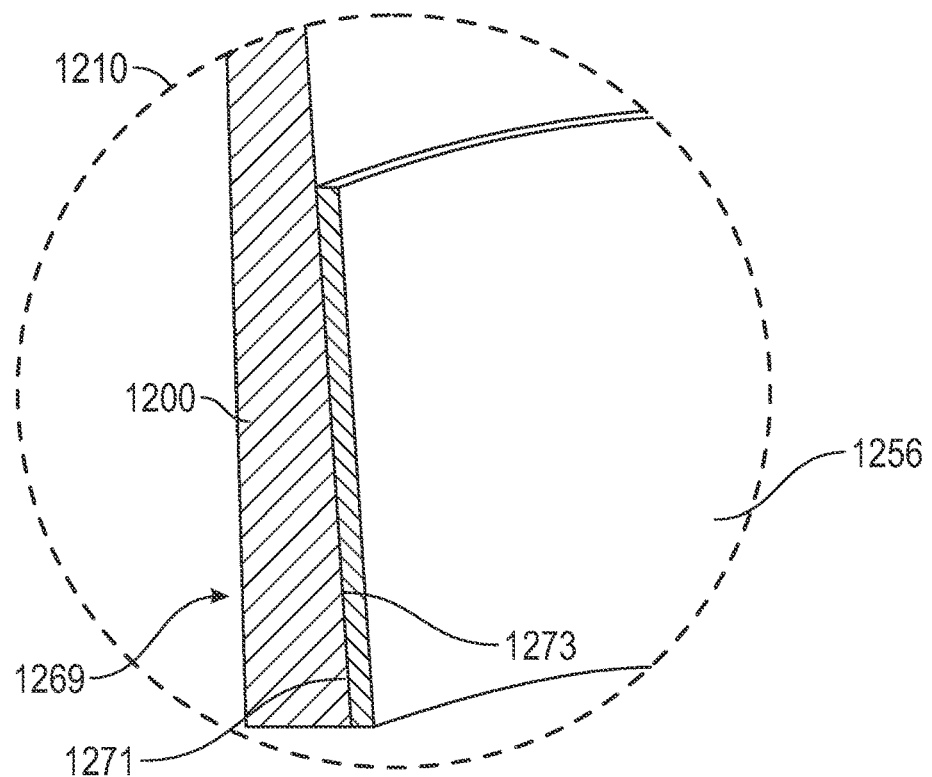
FIG. 15B shows an enlarged view of a shell for the check valve assembly of FIG. 15A, according to an embodiment of the present disclosure.

FIGS. 15A and 15B show an exemplary retention system 1269 for coupling a plate assembly 1250 to a pipe 1200. FIG. 15B shows an enlarged portion 1210 of the retention system 1269. The plate assembly 1250 may be the same as or similar to any of the plate assemblies described herein. The retention system 1269 may include a tapered surface 1271 on the pipe 1200. The retention system 1269 may include a cylindrical surface 1273 on a shell 1256 of the plate assembly 1250. The tapered surface 1271 may be formed of a portion of the pipe 1200 that gradually increases in thickness. The cylindrical surface 1273 may be of a constant diameter and may be non-tapering. The tapered surface 1271 may engage the cylindrical surface 1273 such that an interference fit is established between the shell 1256 of the plate assembly 1250 and the pipe 1200. Thus, the shell 1256 of the plate assembly 1250 may be maintained within or secured within the pipe 1200 due to the interaction between the tapered surface 1271 and the cylindrical surface 1273.

Figure 16A:
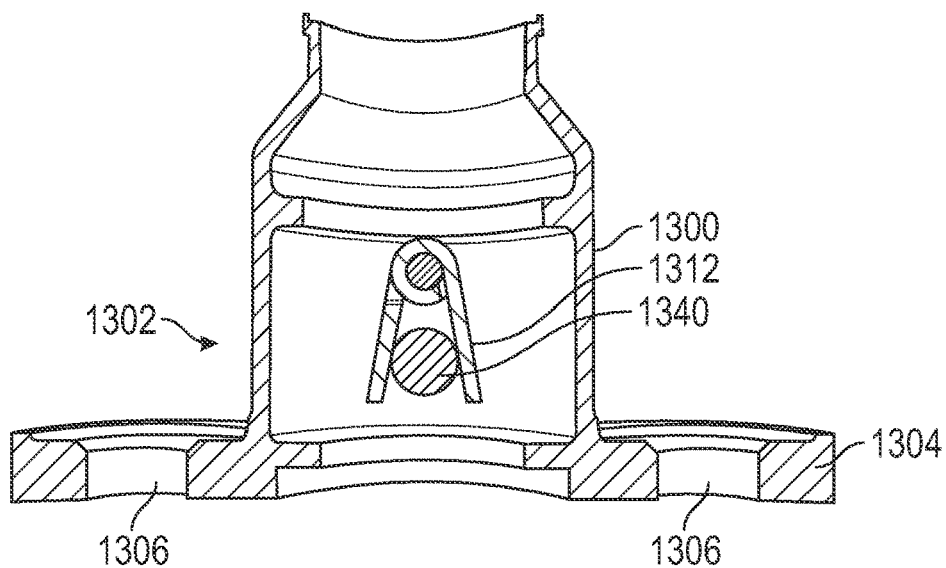
FIG. 16A shows a partial perspective cross-sectional view of a pipe with a check valve assembly taken along a centerline of the pipe, according to an embodiment of the present disclosure.
Figure 16B:
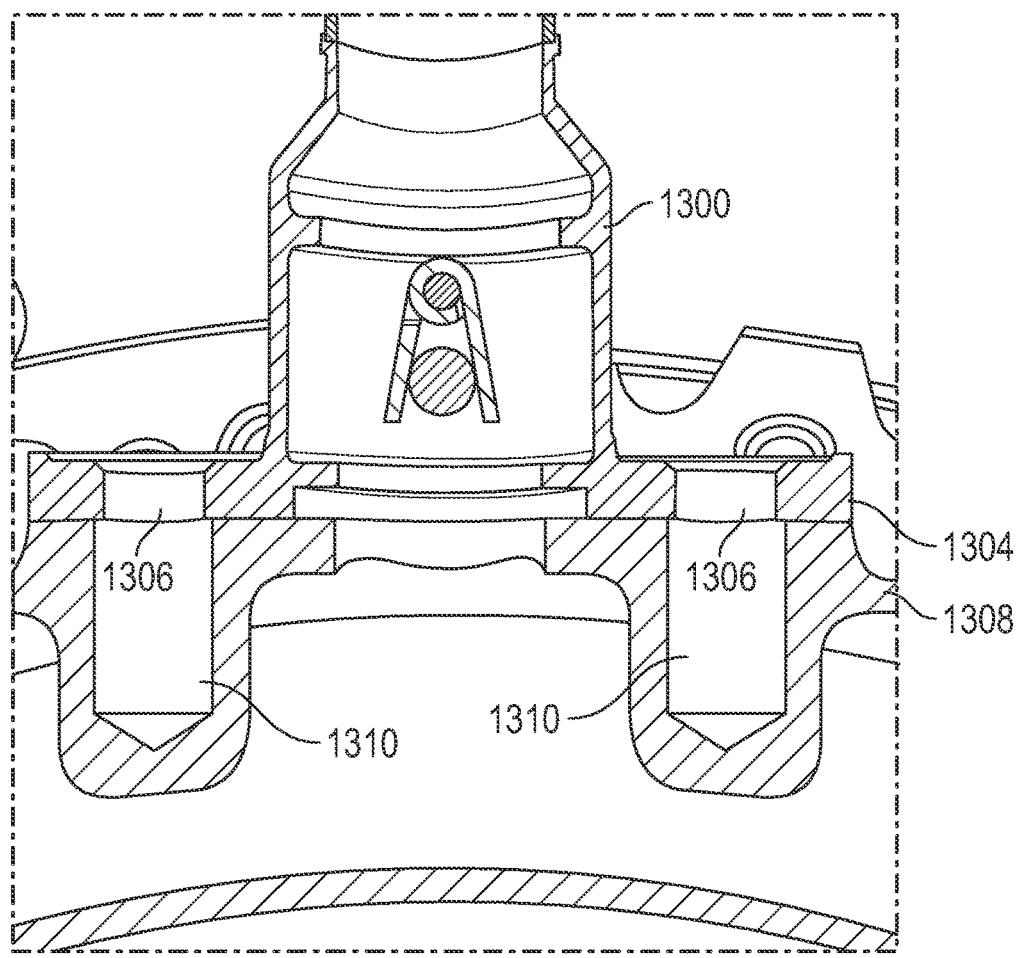
FIG. 16B shows an enlarged view of the pipe with the check valve assembly of FIG. 16A, according to an embodiment of the present disclosure.

FIGS. 16A and 16B show an exemplary retention device for a check valve assembly 1302 in a pipe 1300. The check valve assembly 1302 may include a check valve 1312 and a stopper 1340. The retention device may include a flange 1304 with through holes 1306 on the pipe 1300. The retention device may include a flange 1308 with holes 1310. When assembled, the flange 1304 may align with the flange 1308 such that the through holes 1306 are aligned with holes 1310. In this manner the flange 1304 may be secured to the flange 1308.

Although the embodiments herein describe plate assemblies having two plates, more plates or fewer plates may be provided. The direction, angle, and/or orientation of each plate may be selected based on a desired flow through the pipe. The perforations or openings provided in the plates may take the form of other surface features, such as, for example, grooves, protrusions, indentations, dimples, or the like. The plates herein are described as perforated plates. The plates, however, may include a wire mesh or may include no perforations. The shells described herein may be secured within the pipes without welds.

The plates of the present disclosure may be arranged in a manner that is parallel to the stopper and to the flappers. For example, the long axis, e.g., the longitudinal axis, of the plates may be aligned parallel to the longitudinal axis of the check valve hinge pin and flappers and the stopper. The plates are described herein as rectangular, however may be hexagonal, elliptical, or other shapes. The shell and the plates may be formed of a single sheet metal.

The check valve assembly of the present disclosure may be employed in gas turbine engines, other engines, or other systems flowing liquids through a pipe. For example, the check valve assembly of the present disclosure may be present in compressor supply pipes, stage four and/or stage seven compressor supply pipes and/or cooling air supply pipes. The check valve assembly of the present disclosure may reduce component scrap rates (e.g., reduce the need to replace or to scrap components to due life limiting wear on the parts). The check valve assembly of the present disclosure may include a plate assembly that may be retrofit to or attached to the pipe after manufacturing of the check valve and/or pipe. That is, the design and manufacturing of the check valve need not be changed to accommodate the plate assembly of the present disclosure.

The check valve assembly of the present disclosure may present an aerodynamic solution to reduce vortex shedding, may be a simple design that requires no change to the existing check valve arrangement, and/or may be easily installed and/or fixed in the field.

For the purposes of this disclosure, the terms "coupled," "couple," and/or "coupling" may include direct connection between components and/or indirect connection between components (e.g., connection between two components with one or more intermediate components). Coupling may include fluid coupling. For example, in some embodiments of the plate assemblies of the present disclosure, the coupling of the plate assembly with the supply pipe may be a direct coupling such that the plate assembly is directly connected to the supply pipe with no intervening parts. In another example of the plate assemblies of the present disclosure, the coupling of the plate assembly with the supply pipe may be an indirect coupling such that the plate assembly is indirectly connected to the supply pipe with one or more intervening parts.

Further aspects of the present disclosure are provided by the subject matter of the following clauses.

A check valve assembly for a supply pipe may include a hinge pin; a first flapper and a second flapper, the first flapper pivotally coupled to the second flapper with the hinge pin; a stopper located between the first flapper and the second flapper, the stopper being configured to limit movement of the first flapper and the second flapper; and a plate assembly located downstream of the stopper, the plate assembly being configured to break vortices formed in a fluid flow across the first flapper and the second flapper.

The check valve assembly of any preceding clause, wherein the plate assembly comprises a cylindrical shell, a first perforated plate, and a second perforated plate, wherein the first perforated plate and the second perforated plate each comprises a longitudinal axis that is parallel to a longitudinal axis of the stopper.

The check valve assembly of any preceding clause, wherein the first perforated plate includes a first plurality of openings and the second perforated plate includes a second plurality of openings, and the first plurality of openings and the second plurality of openings are aligned parallel with a direction of the fluid flow.

The check valve assembly of any preceding clause, wherein the first perforated plate is arranged parallel to the second perforated plate.

The check valve assembly of any preceding clause, wherein the first perforated plate and the second perforated plate are converging, diverging, angular baffles, flow guided plates, funnel baffles, or combinations thereof.

The check valve assembly of any preceding clause, wherein the first perforated plate and the second perforated plate are each secured to an interior surface of the cylindrical shell.

The check valve assembly of any preceding clause, wherein the cylindrical shell comprises an anti-rotation feature configured to prevent rotation of the first perforated plate and the second perforated plate within the supply pipe.

The check valve assembly of any preceding clause, wherein the cylindrical shell is a split shell.

The check valve assembly of any preceding clause, wherein the cylindrical shell comprises a retention system configured to maintain the cylindrical shell within the supply pipe.

The check valve assembly of any preceding clause, wherein the retention system comprises at least one indentation on the cylindrical shell configured to receive at least one protrusion on the supply pipe.

The check valve assembly of any preceding clause, wherein the retention system comprises at least one protrusion on the cylindrical shell configured to receive at least one indentation on the supply pipe.

The check valve assembly of any preceding clause, wherein the retention system comprises a shoulder on the supply pipe having an upper surface configured to receive a lower surface of the cylindrical shell.

The check valve assembly of any preceding clause, wherein the retention system comprises a ring on the cylindrical shell, the ring including an opening configured to receive the stopper.

The check valve assembly of any preceding clause, wherein the retention system comprises a groove on the supply pipe and a retention ring or an O-ring, the retention ring or the O-ring configured to receive a lower surface of the cylindrical shell on an upper surface of the retention ring or the O-ring.

The check valve assembly of any preceding clause, wherein the retention system comprises a tapered surface on the supply pipe, the tapered surface configured to provide an interference fit with an outer surface of the cylindrical shell.

The check valve assembly of any preceding clause, wherein the retention system comprises a flange.

The check valve assembly of any preceding clause, wherein the first perforated plate and the second perforated plate each comprise a flat, thin plate having a plurality of openings.

The check valve assembly of any preceding clause, wherein a distal end of each of the first flapper and the second flapper overlaps an upper end of each of the first perforated plate and the second perforated plate.

The check valve assembly of any preceding clause, wherein a distal end of each of the first flapper and the second flapper is spaced a distance from an upper end of each of the first perforated plate and the second perforated plate.

A pipe for a gas turbine engine may include a check valve having two flappers hingedly coupled with a pin; and a perforated plate located downstream of the check valve, the perforated plate being aligned parallel with a direction of a fluid flow through the pipe, and the perforated plate being configured to break vortices formed in the fluid flow through the pipe.

The pipe of any preceding clause, wherein the perforated plate comprises a plurality of perforated plates.

The pipe of any preceding clause, wherein the plurality of perforated plates are welded to an interior surface of the pipe.

The pipe of any preceding clause, wherein the perforated plate comprises a first perforated plate and a second perforated plate, and the first perforated plate is arranged parallel to the second perforated plate.

The pipe of any preceding clause, wherein the perforated plate comprises two perforated plates that are converging, diverging, angular baffles, flow guided plates, funnel baffles, or combinations thereof.

The pipe of any preceding clause, further comprising a shell, wherein the perforated plate is secured to an interior surface of the shell, and the shell is positioned within the pipe at a location downstream of the check valve.

The pipe of any preceding clause, wherein the shell comprises an anti-rotation feature configured to prevent rotation of the perforated plate within the pipe.

The pipe of any preceding clause, wherein the shell is a split shell.

The pipe of any preceding clause, further comprising a retention system configured to maintain the shell within the pipe.

The pipe of any preceding clause, wherein the retention system comprises at least one indentation on the shell configured to receive at least one protrusion on the pipe.

The pipe of any preceding clause, wherein the retention system comprises at least one protrusion on the shell configured to receive at least one indentation on the pipe.

The pipe of any preceding clause, wherein the retention system comprises a shoulder on the pipe having an upper surface configured to receive a lower surface of the shell.

The pipe of any preceding clause, further comprising a stopper configured to limit movement of the two flappers, the stopper located between the two flappers, wherein the retention system comprises a ring on the shell, the ring including an opening configured to receive the stopper.

The pipe of any preceding clause, wherein the retention system comprises a groove on the pipe and a retention ring or an O-ring, the retention ring or the O-ring configured to receive a lower surface of the shell on an upper surface of the retention ring or the O-ring.

The pipe of any preceding clause, wherein the retention system comprises a tapered surface on the pipe, the tapered surface configured to provide an interference fit with an outer surface of the shell.

The pipe of any preceding clause, wherein the retention system comprises a flange.

The pipe of any preceding clause, further comprising a stopper configured to limit movement of the two flappers, the stopper located between the two flappers, wherein a longitudinal axis of the perforated plate is arranged parallel to a longitudinal axis of the stopper.

The pipe of any preceding clause, wherein the perforated plate comprises a flat, thin plate having a plurality of openings.

The pipe of any preceding clause, wherein a distal end of each of the two flappers overlaps an upper end of the perforated plate.

The pipe of any preceding clause, wherein a distal end of each of the two flappers is spaced a distance from an upper end of the perforated plate.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A check valve assembly for a supply pipe, the check valve assembly comprising:
   a hinge pin;
   a first flapper and a second flapper, the first flapper pivotally coupled to the second flapper with the hinge pin;
   a stopper located between the first flapper and the second flapper, the stopper being configured to limit movement of the first flapper and the second flapper; and
   a plate assembly located downstream of the stopper and configured to break vortices formed in a fluid flow across the first flapper and the second flapper, the plate assembly comprising a perforated plate having a longitudinal axis that is parallel to a longitudinal axis of the stopper.

2. The check valve assembly of claim 1, wherein the perforated plate is a first perforated plate, and wherein the plate assembly further comprises a cylindrical shell and a second perforated plate having a longitudinal axis that is parallel to the longitudinal axis of the stopper.

3. The check valve assembly of claim 2, wherein the first perforated plate includes a first plurality of openings and the second perforated plate includes a second plurality of openings, and the first plurality of openings and the second plurality of openings are aligned parallel with a direction of the fluid flow.

4. The check valve assembly of claim 2, wherein the first perforated plate is arranged parallel to the second perforated plate.

5. The check valve assembly of claim 2, wherein the first perforated plate and the second perforated plate are converging, diverging, angular baffles, flow guided plates, funnel baffles, or combinations thereof.

6. The check valve assembly of claim 2, wherein the first perforated plate and the second perforated plate are each secured to an interior surface of the cylindrical shell.

7. The check valve assembly of claim 2, wherein the cylindrical shell comprises an anti-rotation feature configured to prevent rotation of the first perforated plate and the second perforated plate within the supply pipe.

8. The check valve assembly of claim 2, wherein the cylindrical shell is a split shell.

9. The check valve assembly of claim 2, wherein the cylindrical shell comprises a retention system configured to maintain the cylindrical shell within the supply pipe.

10. The check valve assembly of claim 9, wherein the retention system comprises at least one indentation on the cylindrical shell configured to receive at least one protrusion on the supply pipe.

11. The check valve assembly of claim 9, wherein the retention system comprises at least one protrusion on the cylindrical shell configured to receive at least one indentation on the supply pipe.

12. The check valve assembly of claim 9, wherein the retention system comprises a shoulder on the supply pipe having an upper surface configured to receive a lower surface of the cylindrical shell.

13. The check valve assembly of claim 9, wherein the retention system comprises a ring on the cylindrical shell, the ring including an opening configured to receive the stopper.

14. The check valve assembly of claim 9, wherein the retention system comprises a groove on the supply pipe and a retention ring or an O-ring, the retention ring or the O-ring configured to receive a lower surface of the cylindrical shell on an upper surface of the retention ring or the O-ring.

15. The check valve assembly of claim 9, wherein the retention system comprises a tapered surface on the supply pipe, the tapered surface configured to provide an interference fit with an outer surface of the cylindrical shell.

16. The check valve assembly of claim 9, wherein the retention system comprises a flange.

17. The check valve assembly of claim 2, wherein the first perforated plate and the second perforated plate each comprise a flat, thin plate having a plurality of openings.

18. The check valve assembly of claim 2, wherein a distal end of each of the first flapper and the second flapper overlaps an upper end of each of the first perforated plate and the second perforated plate.

19. The check valve assembly of claim 2, wherein a distal end of each of the first flapper and the second flapper is spaced a distance from an upper end of each of the first perforated plate and the second perforated plate.

20. A pipe for a gas turbine engine, the pipe comprising:
a check valve having two flappers hingedly coupled with a pin;
a stopper located between the two flappers; and
a perforated plate located downstream of the stopper, the perforated plate being aligned parallel with a direction of a fluid flow through the pipe and configured to break vortices formed in the fluid flow through the pipe, the perforated plate having a longitudinal axis that is parallel to a longitudinal axis of the stopper.

* * * * *